United States Patent [19]

Vij et al.

[11] Patent Number: 4,788,682
[45] Date of Patent: Nov. 29, 1988

[54] TELEPHONE SYSTEM ADAPTED TO TELEMARKETING

[75] Inventors: Jagdish C. Vij, Saratoga; Herbert L. Steierman, Sunnyvale, both of Calif.

[73] Assignee: Northern Telecom Limited, Montreal, Canada

[21] Appl. No.: 910,642

[22] Filed: Sep. 23, 1986

[51] Int. Cl.$^4$ ............................................. H04J 3/12
[52] U.S. Cl. .................................... 370/110.1; 379/96
[58] Field of Search .................... 370/110.1, 58, 119; 379/92, 96, 97, 213, 265, 266

[56] References Cited

U.S. PATENT DOCUMENTS

| | | | |
|---|---|---|---|
| 3,920,908 | 11/1975 | Kraus | 379/245 |
| 3,989,899 | 11/1976 | Norwich | 379/92 |
| 4,048,452 | 9/1977 | Oehring et al. | 379/266 |
| 4,069,399 | 1/1978 | Barrett et al. | |
| 4,381,427 | 4/1983 | Cheal et al. | |
| 4,450,556 | 5/1984 | Boleda et al. | |
| 4,600,814 | 7/1986 | Cunniff et al. | 379/94 |
| 4,608,685 | 8/1986 | Jain et al. | |
| 4,656,623 | 4/1987 | Dalby, Jr. et al. | 379/96 |
| 4,694,483 | 9/1987 | Cheung | 379/265 |
| 4,734,931 | 3/1988 | Bourg et al. | 379/96 |

Primary Examiner—Douglas W. Olms
Assistant Examiner—Melvin Marcelo
Attorney, Agent, or Firm—Foley & Lardner, Schwartz, Jeffery, Schwaab, Mack, Blumenthal & Evans

[57] ABSTRACT

In a merchandising business wherein telephone subscribers' responses are solicited by various commercial advertisements via the television and/or radio media, merchandising agents receive such telephone responses in order to accept requests for goods and services and to expedite deliveries and billings. A telephone system is disclosed wherein a portion of a direct dialled number associated with an advertised product is forwarded to an information server. The information server provides information about the product, such information being displayable at a data display terminal adjacent a merchandising agent's position. In the case where a group of merchandising agents is accessed via an automatic call distributing feature in the telephone system, the voice call and the data information appear at a selected merchandising agent's position at about the same time, thereby informing the agent as to the particular item of interest and its attributes in association with the voice call.

4 Claims, 6 Drawing Sheets

TELEPHONE SYSTEM ADAPTED TO TELEMARKETING

FIELD OF THE INVENTION

The invention relates to the field of merchandising via telecommunications mediums. More particularly, the invention relates to adaptations of telephone systems and the like, for a merchandising function, sometimes referred to as telemarketing.

BACKGROUND OF THE INVENTION

Advertisements of merchandise and services via the electronic medium of television and radio are well known commercial activities. Some of these advertisements solicit a telephone response in order to facilitate delivery of merchandise and payment for same. Upon witnessing a particular advertisement, an interested person dials a telephone number as given in the advertisement, to speak with a merchandising agent. The merchandising agent is located at some convenient place for this purpose and in the first instant was provided with a telephone having a directory number as given in the advertisement. Thus, soon after an occurrence of the advertisement, a great many telephone calls may be directed to the merchandising agent. As the merchandising agent and a potential customer are in telephone conversation, subsequent telephone calls from other potential customers are not completed. Actually, many potential customers become discouraged with repeated attempts to reach the merchandising agent. Furthermore, the intially aroused impulse to purchase deteriorates with time, such that some potential purchasers never make more than one attempt to complete a telephone call to the merchandising agent. Consequently, a very significant amount of business is lost. Attempts to reduce the amount of lost business includes the employ of more merchandising agents along with an automatic call distribution system so that many potential customers are served at the same time. However, as the rate at which calls occur is highest just after the occurrence of the advertisement, employment of sufficient agents and telephones to respond to this peak calling rate results in a high proportion of idle agents during intervals between airing occurrences of the advertisement. An advantageous reduction in the number of employed agents can be achieved by providing the telephone system with a call waiting feature. With the call waiting feature, when an agent is not immediately available, the caller is exposed to further information or entertainment intended to urge the potential customer to remain active in the telephone call for a period long enough for one of the agents to become available to receive the call. Nevertheless, there remains a balancing problem in regard to optimizing the business activity so the least amount of operating expenses per unit volume of sales is achieved.

An alternate solution lies in having a plurality of advertisements which direct the potential purchasers to the same group of merchandising agents. In such an arrangement, the workload of the agents may be more randomly distributed and their time hence more efficiently utilized. However, this incurs a major disadvantage in that the merchandising agent must query the potential customer as to which of the various products the caller is interested in. The agent's function is therefore more complicated and probability of error is increased. Errors frequently result in wrong shipments and subsequent corrective costs which may nullify any initial cost saving.

SUMMARY OF THE INVENTION

It is an object of the invention to provide a telephone system and method which optimizes a number of calls per unit time which may be correctly handled by a merchandising agent in a telemarketing business.

In accordance with the invention a controller in a telephone switching system operates in a call progress to recognize a dialled telephone number as being within a special number group. Thereafter, in a process of completing the call in progress, at least the last digit of the dialled telephone number is transmitted to an information server apparatus which is operative in association with the telephone call to provide displayable information for use by a called party.

The invention is a telephone method for automatically identifying an item of purchase to a merchandising agent. The merchandising agent is provided with a telephone station set and an information display. The method includes the steps of assigning a plurality of directory numbers to the telephone station set and storing a product information in association with each of the telephone directory numbers, in a storage medium. In response to an incoming telephone call to one of the directory numbers, the incoming telephone call is connected to the telephone station set and an indication of the directory number is communicated to the information storage medium. The product information associated with the directory number is transmitted from the storage medium to the information display where it is displayed to automatically inform the merchandising agent as to the item for purchase.

In one example, telemarketing features in accordance with the invention are provided in a private branch exchange (PBX). A switching network, and a call controller for controlling the switching network in the PBX provide for a direct inward dialing feature such that in operation, a telephone call routed to the PBX via a central office telephone facility is directly connectable to a telephone station set connected to the PBX and associated with a corresponding PBX directory number. The call controller causes a direct inward dialled call which identifies one of a predetermined plurality of PBX directory numbers to be connected, via the switching network, to a predetermined telephone station set. The call controller also causes the PBX directory number to be communicated to an information server in response to each occurrence of a direct inward dialled telephone call of a number corresponding to one of the plurality of predetermined PBX directory numbers. The information server includes memory means wherein information is stored in association with each of the predetermined plurality of PBX directory numbers. The information server is responsive to each of the directory numbers, when communicated thereto, for routing the associated information from the memory means to the switching network and hence be directed by the call controller to an information display means associated with the telephone station set.

In every example of the invention, a call controller in the telephone switching system causes an indication of an incoming dialled telephone number to be directed to an information server or the like. Such indication is directed via a direct signalling path between the call controller and a common information server or is directed via a supervisory and signalling path associated with a data call or a pseudo data call which is directed to an information server dedicated to a telephone terminal to which said incoming dialled telephone call is directed for completion.

BRIEF DESCRIPTION OF THE DRAWINGS

Example embodiments of the invention are discussed with reference to the accompanying drawings in which.

DESCRIPTION OF THE EXAMPLE EMBODIMENTS

Figure 1:
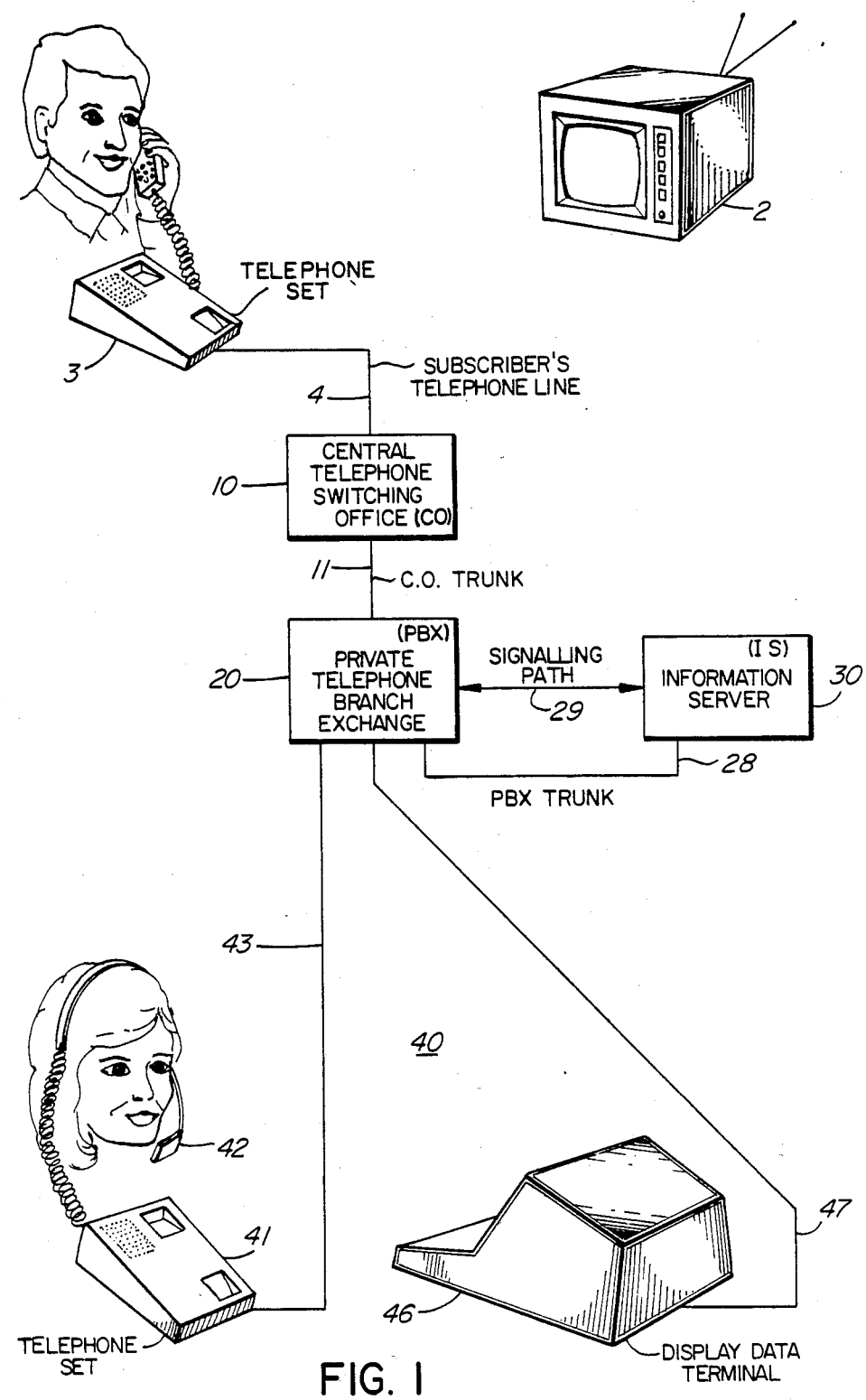
FIG. 1 is a block schematic diagram representative of telephone systems including a private branch exchange (PBX) for providing a telemarketing feature in accordance with the invention.

Referring to FIG. 1, a central telephone switching office (CO) 10 is coupled via a central office (CO) trunk 11 to a private telephone branch exchange (PBX) 20 for providing the telemarketing feature. The PBX 20 is connected to an information server 30 via a signalling path 29 and a PBX trunk 28. A merchandising agent position at 40 includes a telephone set 41 including a handset or a headset 42 for use in a manner as depicted in the diagram. The telephone set 41 is connected via a telephone line 43 to the PBX 20. The merchandising agent position at 40 also includes a display data terminal 46 connected via a telephone line 47 to the PBX 20. The PBX 20 is illustrated in more detail in FIG. 2, wherein the CO trunk 11 is of the analog signal type and is coupled to a TDM PCM switching network 22 by a trunk interface circuit 24. The PBX trunk 28 is coupled to the switching network 22 by a trunk interface circuit 27. In this example, the telephone line 43 is of the analog signal type and is connected to the switching network 22 by a line interface circuit 25. The circuits 24 and 25 each include encoders and decoders (not shown) commonly referred to as CODECs for connecting between analog signals and the digital signal format of the switching network 22. A digital line interface circuit 26 provides for coupling of the data display terminal 46 with the switching network 22. A call controller 21 provides for operation of the switching network to provide the normal PBX operation and to invoke and control the telemarketing feature via the signal path 29 which is connected to the information server which is illustsrated in more detail in FIG. 3.

The PBX 20 is a simplified illustration of a TDM PCM Communication System disclosed in U.S. Pat. No. 4,069,399 which issued to Bruce Robert Barrett and Alan Stanley John Chapman on Jan. 17, 1978.

Figure 3:
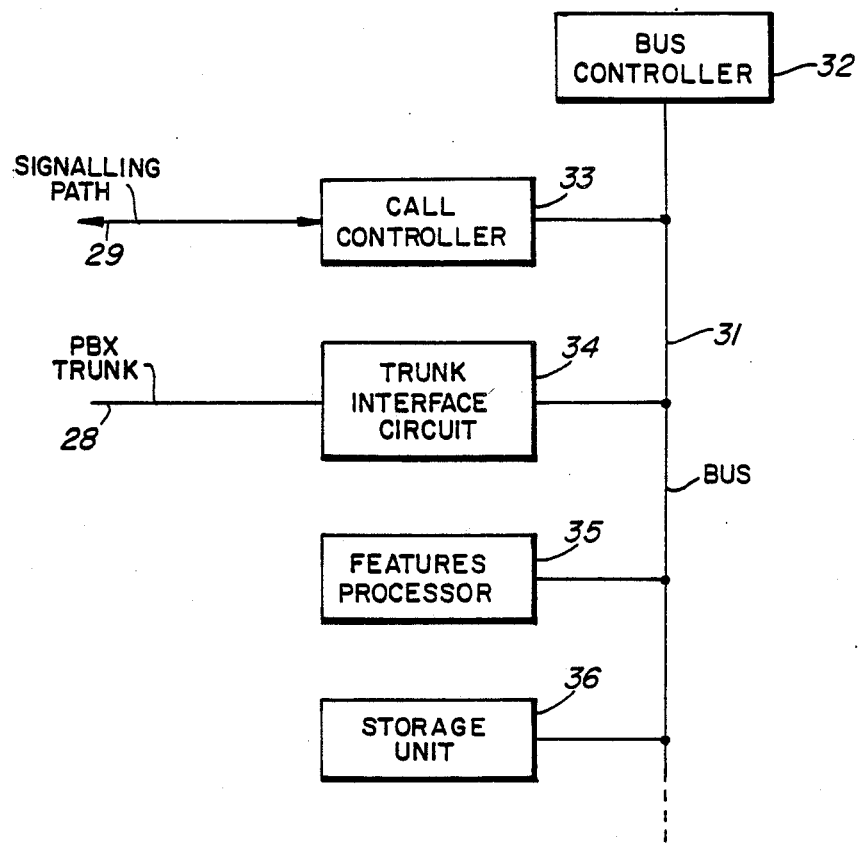
FIG. 3 is a block schematic diagram of an information server used in FIG. 1.

The information server in FIG. 3 includes a call controller 33, a trunk interface circuit 34 a features processor 35 and a storage unit 36 all interconnected to a bus 31 and having access thereto for signal transmission as determined by a bus controller 32. The structure and operation of a suitable information server is disclosed in more detail in U.S. Pat. No. 4,608,685 titled Packet and Circuit Switched Communications Network, and issued to Prem C. Jain and Frederick Enns on Aug. 26, 1986.

The telemarketing feature is provided for by the feature processor 35 and by applications programs and merchandising information stored in the storage unit 36.

Figure 2:
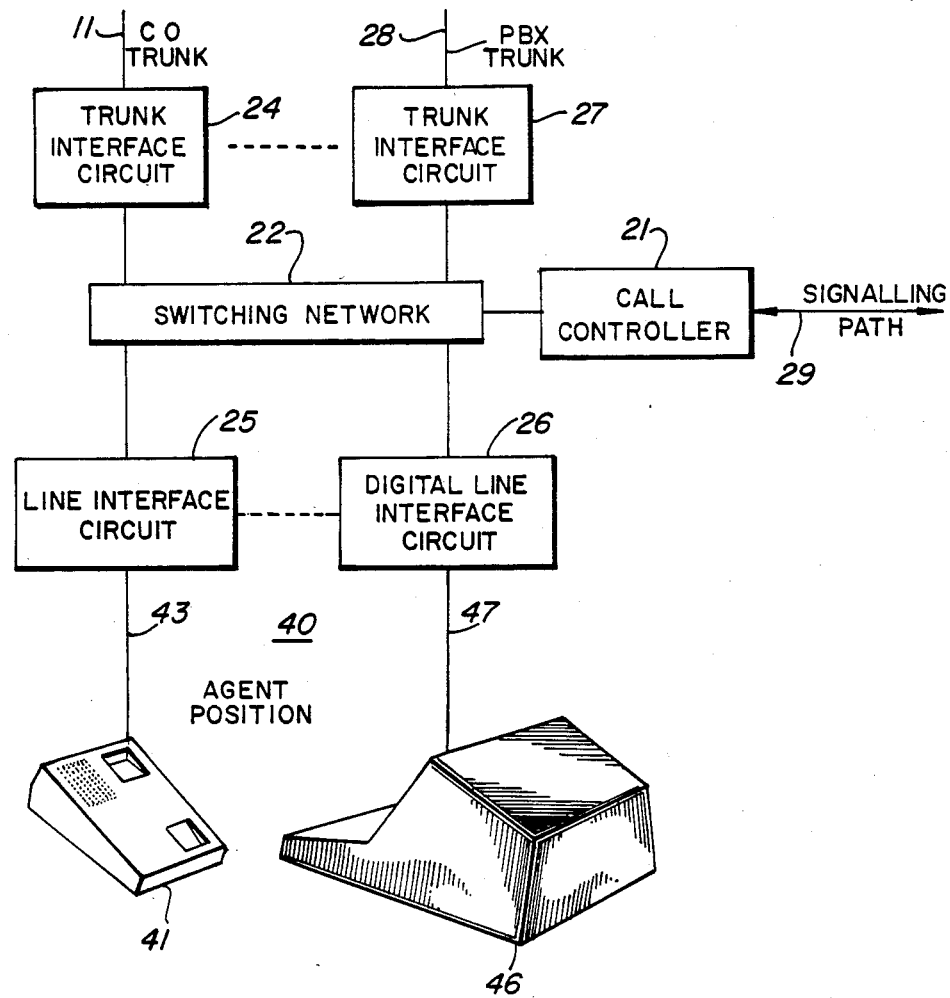
FIG. 2 is a block schematic diagram off an exemplary PBX used in FIG. 1.

In order for the telemarketing feature to be invoked, a direct inward dialled call is completed through the central office 10 to the PBX 20. Of necessity, such calls include signalling of the PBX extension directory number from the CO 10 to the PBX 20. Referring to FIG. 1, the call is originated by a telephone subscriber 1, via a telephone set 3 and a subscriber telephone line 4, in response to an advertisement received by the telephone subscriber via a television receiver 2. If the extension directory number resides within a group of numbers reserved for the telemarketing feature, the call controller 21 establishes a voice call connection between the trunk or channel of the incoming call and the station set at a merchandising agent's position at 40. It should be understood that there may be many different numbers in the group but as few as only one agent's position. However, more practically, there are normally a plurality of agent's positions. There is no fixed relationship between the number of agent's positions and the extension directory numbers assigned to items of merchandise. At the same time the voice call connection is established, the call controller 21 sets up the connection through the switching network 22 and the extension directory number is transmitted via the signalling path 29 to the call controller 33, in the information server in FIG. 3. The extension directory number is passed on to the features processor 35, via the bus 31, which in turn responds by fetching corresponding mechandise information from the storage unit 36. The call controller 33 also reserves a channel via the trunk interface circuit 34 and the PBX trunk 28 for data communication between the features processor 35 and the switching network. The call controller 21 in FIG. 2 is informed of this data communication channel via the signalling path 29 so that it can set up a communication path through the switching network 22 to the display data terminal 46 at the merchandising agent's position 40, to which it previously directed the direct inward dialled call. Once the data communication path is completed the call controller 21 informs the call controller 33 which in turn sets up a syncronous channel on the bus 31 between the features processor 35 and the trunk interface circuit 34. Subsequently, the merchandising information is transferred to the data display terminal 46 and displayed there to assist the merchandising agent in handling the calling customer's purchase request. Of course, the merchandising information may be displayed immediately as it is available or alternately the display may be contingent upon the merchandising agent answering the call.

Figure 4A:
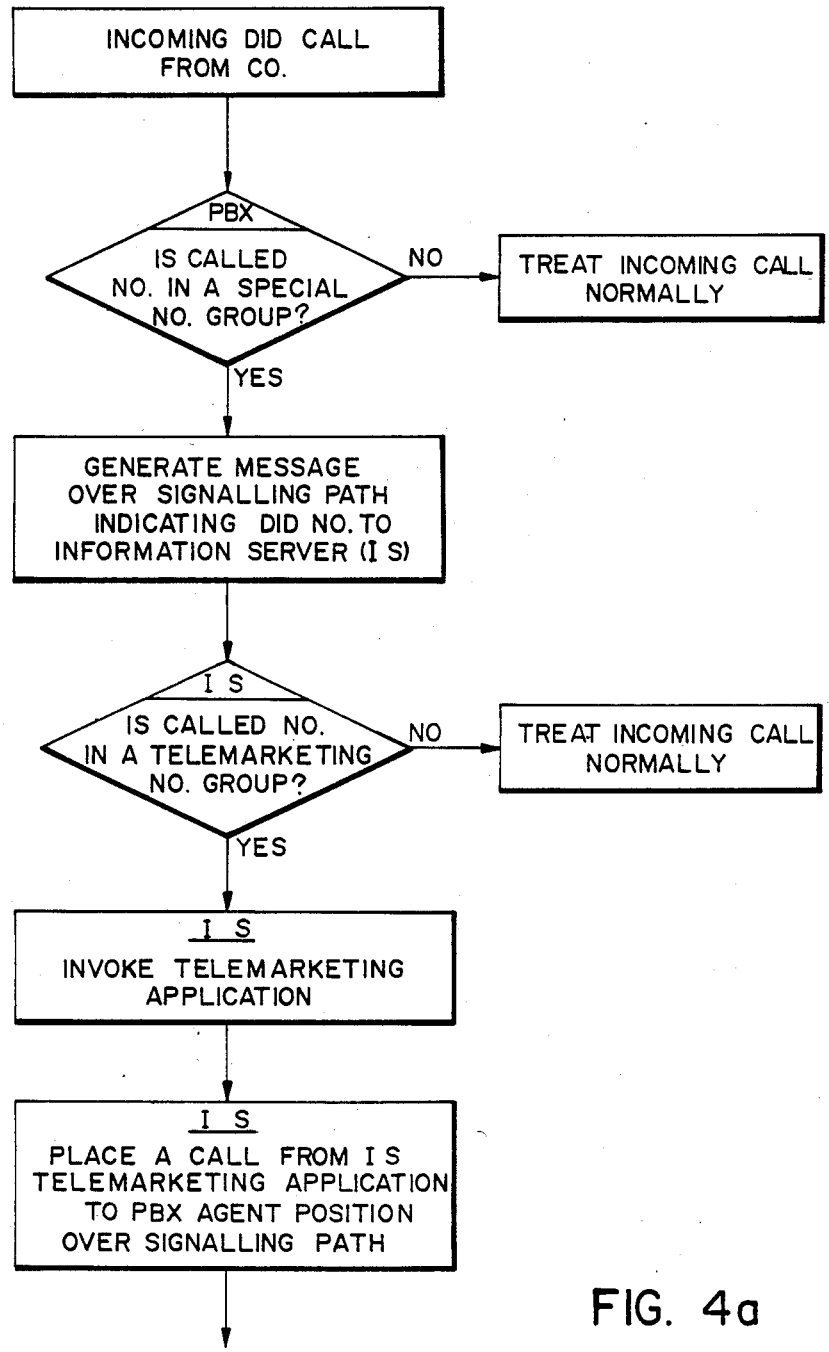
FIGS. 4a and 4b are flow chart respresentations of the operation of the telemarketing feature in the system in FIGS. 1, 2 and 3.
Figure 4B:
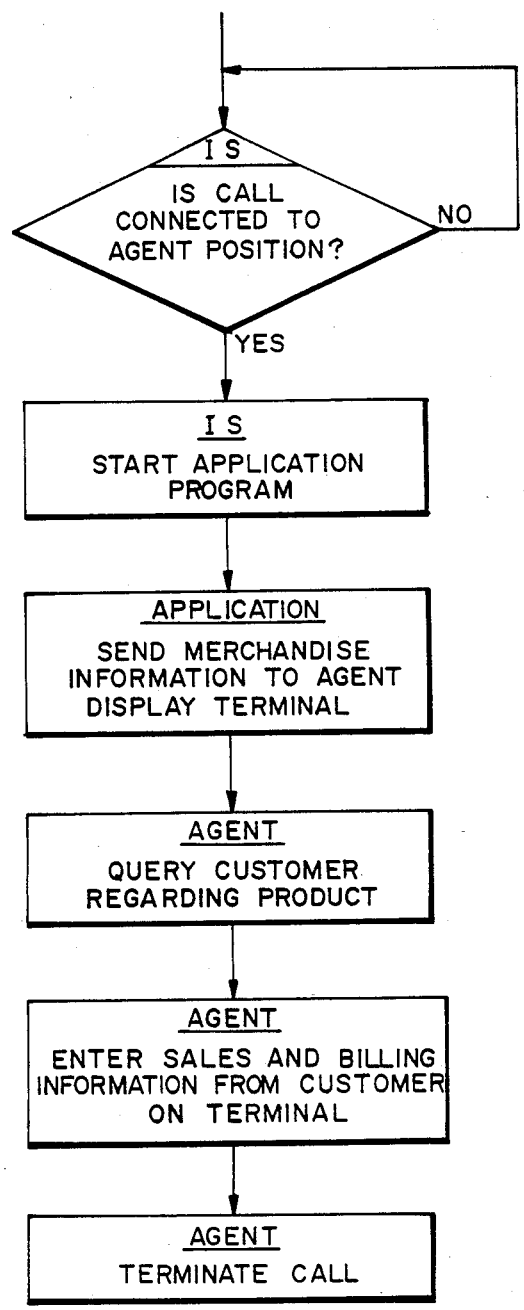

The functions as discussed in the preceeding paragraph are sequentially illustrated in the flow chart in FIGS. 4a and 4b.

Figure 5:
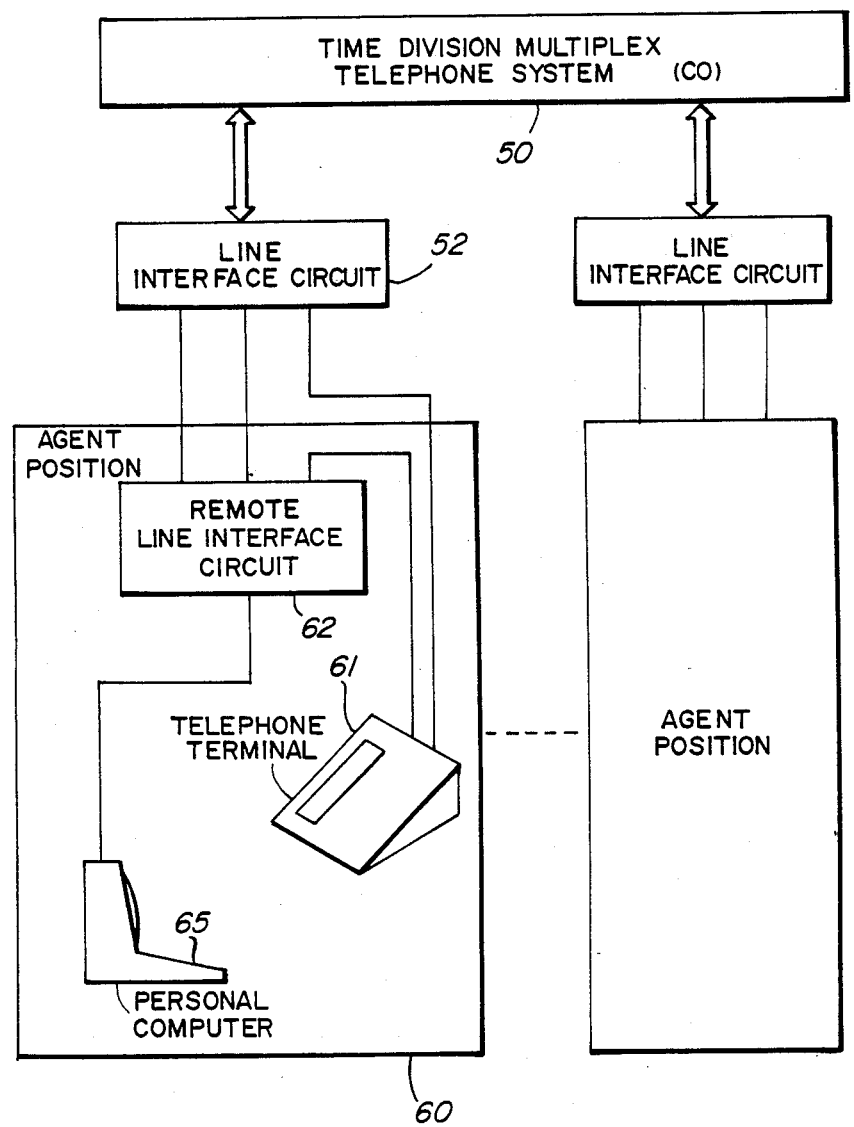
FIG. 5 is a block schematic diagram illustrating a small PBX combined with personal computers for providing the telemarketing feature in accordance with the invention.

The telemarketing feature as provided in the apparatus illustrated in FIGS. 1, 2 and 3 with reference to the previously mentioned patents may also be provided on a more limited scale by apparatus as generally depicted in FIG. 5. In this case, an agent position 60 is connected directly to a central office 50 of an operating telephone company, such central office being arranged to provide business oriented telephone services sometimes referred to as Centrex. The central office 50 is arranged to recognize predetermined merchandise directory numbers as being in a group for automatic call distribution to a group of the agent positions 60. Each of the agent positions 60 includes a telephone terminal 61 and a personal computer 65, the personal computer 65 having been loaded with appropriate telemarketing merchandise information. The central office 50 directs the telephone call to the agent position 60 via a line interface circuit 52 which is connected to the telephone terminal 61 and to a remote line interface circuit 62. The central office is adapted to signal the last few digits of each inward call occurrence to the line interface circuit 52 associated with the agent position. The remote line interface circuit at the agent position passes these digits to the personal computer 65 which is thus enabled to display the required merchandise information.

Elements appropriate for providing the line interface circuits and the remote line interface circuits as illustrated in FIG. 5 are disclosed in more detail in U.S. Pat. No. 4,381,427, titled Subscriber Loop System for Voice and Data which issued on Apr. 26, 1983 to William E. Cheal et al, and in U.S. Pat. No. 4,450,556, titled Digital Signal Subscriber Loop and Interface Circuit which issued on May 22, 1984 to Alberto Boleda and Terence N. Thomas.

It will become apparent to the reader that the basic telemarketing feature as described herein, and variations of same, may well be enhanced. For example, such enhancement includes key board entry of details of the customers voiced purchase quantity and method of payment. Such entered data is used to generate the required accounting, billing, packaging, shipping and delivering functions normally associated with this type of merchandising function, and such entered data may be used locally or transmitted via the telephone system to remote locations.

Alternately it is envisaged that the merchandising function is completely automated such that machine generated voice communication is directed to the calling party, such machine voice communication being designed to solicit detectable touch tone key pad responses from the customer for ordering and confirmation functions, et cetera.

What is claimed is:

1. A method for operating a telephone system in conjunction with an information server for providing a telemarketing function wherein displayable merchandising information is provided in association with a telephone terminal to which an incoming dialled telephone call is t be directed, the method including the steps of:
(a) in a call controller for directing operation of a switching network connected with said telephone terminal;
    (i) recognizing a directory number indicated by the incoming dialled telephone call as being within a special number group;
    (ii) directing the incoming call to said telephone terminal; and
    (iii) transmitting indication of a portion of the indicated directory number to an information server.

2. A method as defined in claim 1 wherein said information server is a common or shared information server and comprising the further step of:
    (iv) establishing a communication path in the telephone system from the information server for transmission of said displayable marketing information to a data display terminal adjacent said telephone terminal.

3. A telephone method for automatically identifying an item for purchase to a merchandising agent provided with a telephone station set and an information display means, the method comprising the steps of:
    assigning a plurality of telephone directory numbers to the telephone station set;
    in a storage medium, storing a product information in association with each of said telephone directory numbers;
    in response to an incoming telephone call to one of said directory numbers, connecting said incoming telephone call to said telephone station set and communicating an indication of said directory number to the information storage medium;
    transmitting the information associated with the directory number from the information storage medium to said information display means; and
    displaying the associated information whereby the merchandising agent is automatically informed as to the item for purchase in association with the incoming telephone call.

4. A telephone switching system including a switching network being connected with a central office trunk, a PBX trunk, and at least one telephone station set, and comprising:
    an information display device physically adjacent the telephone station set and being connected to the switching network for receiving display data therefrom;
    an information server connected to the PBX trunk and being responsive to indictions of any of a plurality of predetermined extension directory numbers for providing associated information via the PBX trunk; and
    a call controller for connecting direct inward dialled calls identifying one of the plurality of perdetermined extension directory numbers to the telephone station set, for communicating an indication of said directory number to the information server, and for connecting the PBX trunk via the switching network to the information display device.

* * * * *